W. B. LEE.
NOZZLE.
APPLICATION FILED AUG. 3, 1920.
1,398,868.
Patented Nov. 29, 1921.
2 SHEETS—SHEET 1.
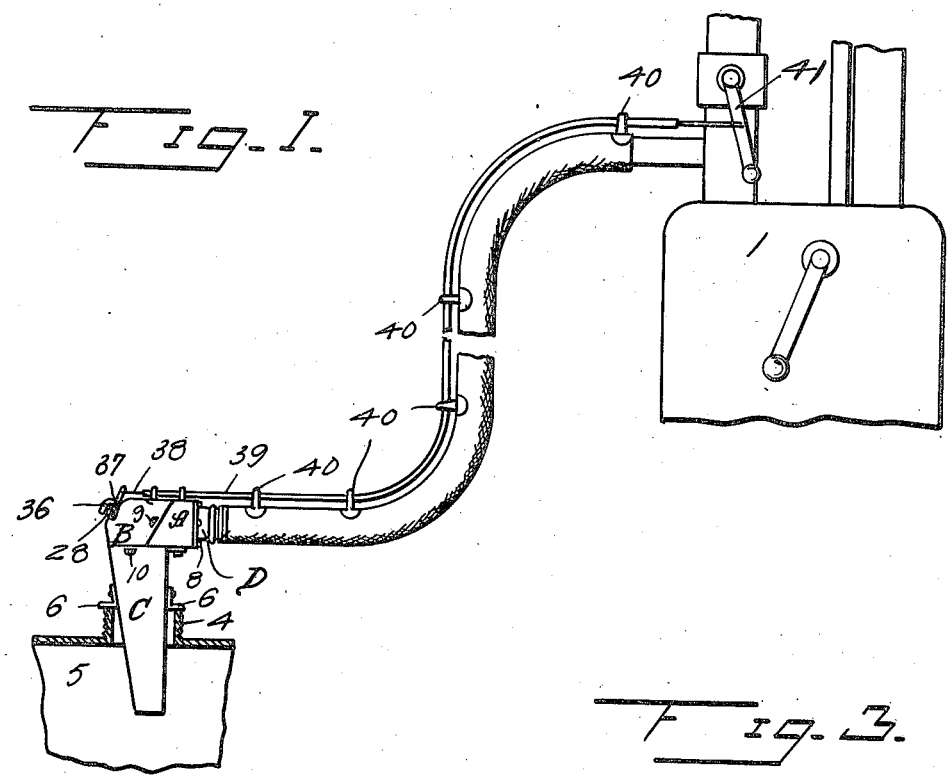
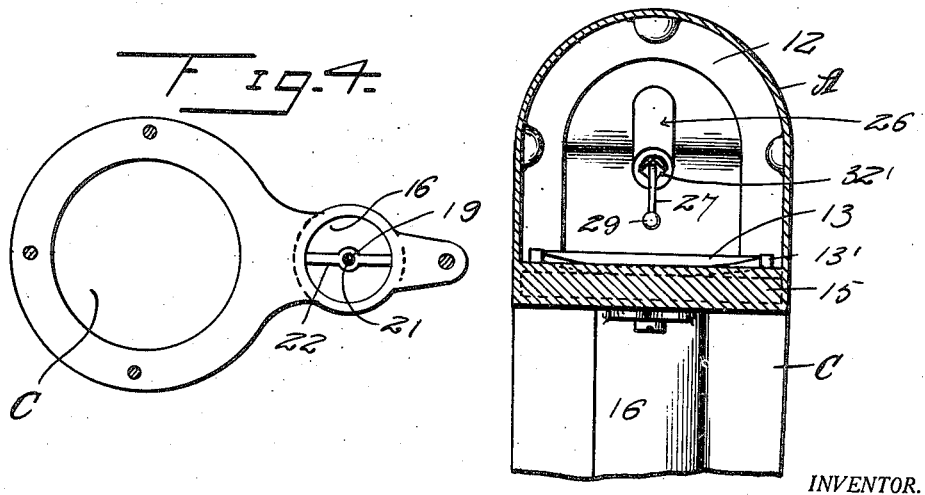
INVENTOR.
W. B. Lee
BY
ATTORNEY.

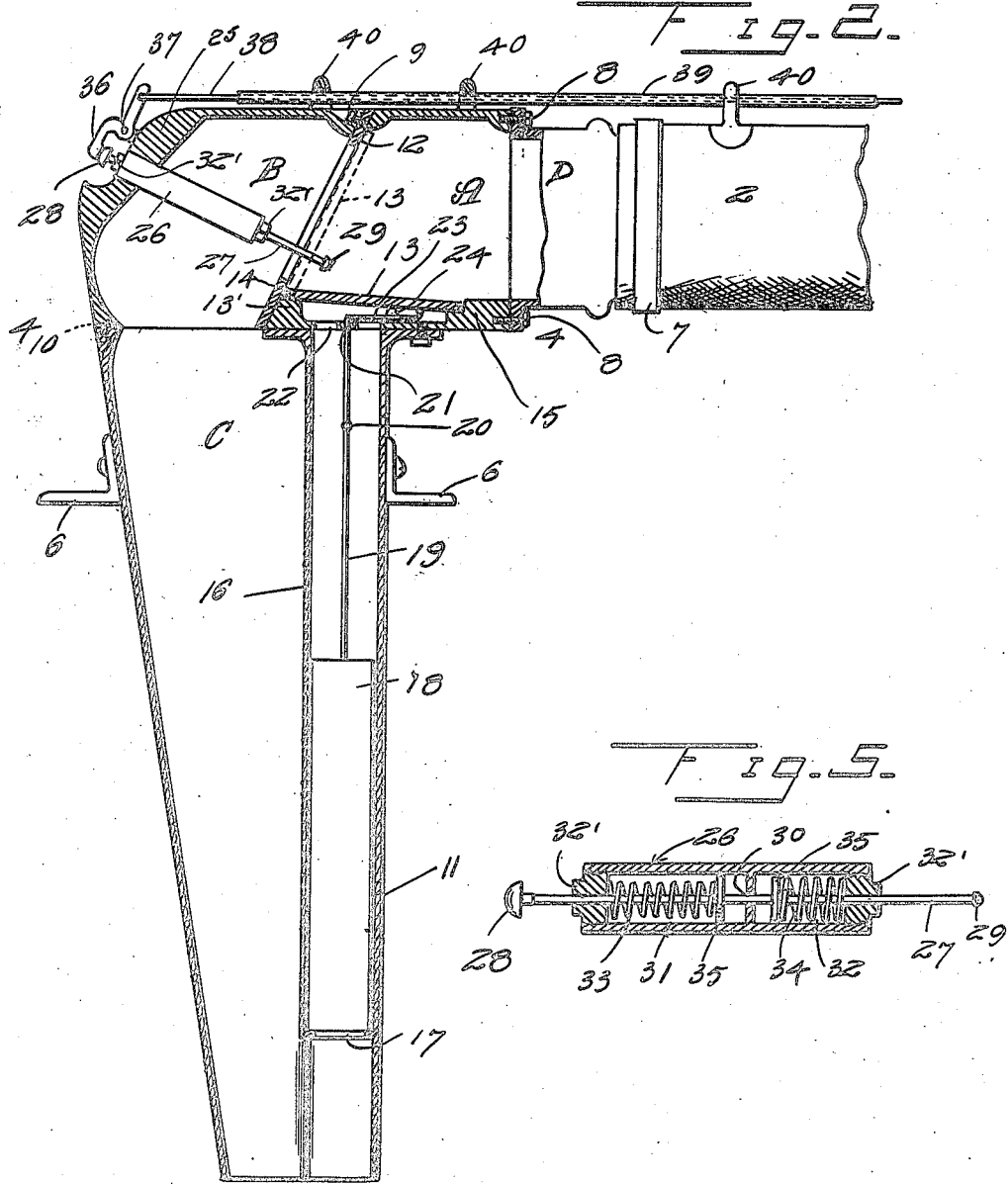

UNITED STATES PATENT OFFICE.

WILLIAM B. LEE, OF SEATTLE, WASHINGTON.

NOZZLE.

1,398,868.  Specification of Letters Patent.  Patented Nov. 29, 1921.

Application filed August 3, 1920. Serial No. 401,039.

*To all whom it may concern:*

Be it known that I, WILLIAM B. LEE, a citizen of the United States, residing at Seattle, in the county of King and State of Washington, have invented certain new and useful Improvements in Nozzles; and I do hereby declare the following to be a full, clear, and exact description of the invention, such as will enable others skilled in the art to which it appertains to make and use the same.

This invention relates to new and useful improvements in nozzles especially adaptable for use in connection with pumps for supplying motor vehicles with fuel and has for its primary object the provision of means for automatically stopping the flow of fluid therethrough when the tank or reservoir becomes filled to a predetermined degree.

Another object of this invention is the provision of a valve release which will permit opening of the valve after the same automatically closes to permit draining of the pump hose into the tank or reservoir of the vehicle.

A further object of this invention is the provision of a nozzle of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings in which:—

Figure 1 is a view illustrating a nozzle constructed in accordance with my invention and illustrating the same associated with a pump and tank of a vehicle.

Fig. 2 is a vertical sectional view illustrating the nozzle,

Fig. 3 is a transverse sectional view taken on the line 3—3 of Fig. 2,

Fig. 4 is a longitudinal sectional view taken on the line 4—4 of Fig. 2,

Fig. 5 is an enlarged detail sectional view, illustrating the valve released and its controlling lever.

Referring in detail to the drawings the numeral 1 indicates an ordinary pump for supplying fuel to vehicles and has connected thereto the usual hose 2, to which my nozzle is connected. The nozzle is adapted to be inserted within the filling neck 4 of the fuel tank 5 of the vehicle and limited in its movement into said fuel tank by supporting ears 6. The nozzle consists of sections A, B, C and D respectively and the section D is secured to the end of the hose 2 by a suitable clamp 7 and is detachably secured to one end of the section A by screws or like fasteners 8. The other end of the section A is disposed on an incline and one end of the section B is disposed on a corresponding incline and is adapted to abut the inclined end of the section A and be secured thereto by screws or fasteners 9. The section B is in the form of an elbow as clearly shown in the drawings and has connected thereto by means of screws or like fasteners 10 a discharge spout 11 which tapers from its attached end in the direction of its free end so that the same can be readily inserted within the filling neck 4 of the fuel tank 5.

The inclined end of the section A is provided with an inclined valve seat 12 adapted to be engaged by a check valve 13 when in one of its positions.

A shoulder 13' is formed in the section A and has the check valve 13 pivoted thereto by means of a pin 14. A second valve seat 15 is located on the lower wall of the section A adjacent the section D and is adapted to receive the free edge of the check valve 13 when in its open position.

A float chamber 16 is formed within the discharge spout 11 and extends from its upper end to a point adjacent its lower end and said float chamber has an opening 17 in its bottom wall to permit the fluid to enter said float chamber when said fluid backs up in the discharge nozzle 11 owing to the fuel tank of the vehicle becoming filled. A float 18 is located within the float chamber and has connected thereto a sectional float stem 19, which sections are connected by a coupling 20. The upper section 20 extends through an opening 21 formed in a guide member 22 and has its upper end bent angularly as illustrated at 23 to engage the float valve at a point adjacent its free edge and is located between guide elements 24 formed in the section A. The upper end of the float chamber 16 is in communication with the section A directly under the float when said float is in an open position. It is to be noted that the float occupies an open position in such a manner that the flow of fluid from the hose may pass over said check and through the valve seat into the section B thence into the section C and discharged therefrom into the fuel tank of the vehicle. The guide elements 24 are adjustable and are adapted to limit or regulate the movement of the valve into an open position or its location in respect to the valve seat 15.

When the fluid in the supply or fuel tank of the vehicle reaches a predetermined level, the float 18 rises causing the float stem 19 to swing the check valve 13 upwardly a short distance and within the path of the fluid passing through the section A and the fluid then strikes under the check valve and forces the same against the valve seat stopping the flow of fluid into the section B and also the section C.

The section B is provided with an enlargement 25 provided with an opening in which is fitted a housing 26. The housing 26 slidably supports a needle 27 provided with a head 28 and a foot 29 and foot 29 is adapted to engage the check valve. An apertured partition 30 is formed in the housing 26 to divide the same into compartments 31 and 32 respectively. The ends of the housing are closed by removable plugs 32'. Springs 33 and 34 are located within the compartments 31 and 32 respectively and surround the needle 27 and one of the ends of said springs bear against the ends of the housing 26 while their other ends bear against collars 35 secured to the needle 27 so that said springs will operate on the needle in opposition to each other. The head 28 is disposed outwardly of the section B and is adapted to be engaged by a lever 36 pivoted to the section B as illustrated at 37 and has connected thereto a flexible element 38. The flexible element 38 extends through a flexible housing 39 carried by the nozzle and hose 2 by eyelets or brackets 40 and the other end of the flexible element 38 is connected to a controlling lever 41 located at the pump 1.

The springs 33 and 34 normally support the foot of the needle 29 a slight distance beyond the valve seat 12 or on an opposite side of the valve seat 12 from the housing 26 and in the path of the valve 13 when moving to a closed position. As the fuel tank of the vehicle becomes filled to a predetermined degree the float rises moves the check valve upwardly within the path of the flowing fluid permitting said fluid to strike against the under face of the valve and move the same rapidly into engagement with the valve seat 12 thereby stopping the flow of the fluid to the vehicle supply tank. When the valve 13 engages the valve seat 12, the needle 27 is moved outwardly compressing the spring 33 and positioning the head 28 against the lever 36; the operator then actuates the control lever 41 to rock the lever 36 on its pivot and move the needle inwardly with the aid of the spring 33 to unseat the valve 13 and permit the contents of the hose to drain into the fuel tank of the vehicle by way of the nozzle, thereby fully filling said tank and after the draining of the nozzle, the valve 13 engages the seat 15 positioning itself again ready to cut off the supply of fluid to another tank when the same becomes filled to a predetermined degree. It is understood that the operation of the pump is discontinued when the operator actuates the controlling lever 41 and after the valve has returned to an open position or in engagement with the valve seat 15, the controlling lever is returned to its initial position and the spring 32 returns the needle 27 to its initial position.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A nozzle comprising a body connected to a fluid supply hose, a discharge spout for said body, an inclined valve seat in said body, a check valve pivoted in said body and normally occupying a position out of the path of the fluid passing through the body, a float in said spout, a stem connected to the float and adapted to elevate the valve into the path of the fluid on elevation of the float to permit the fluid to seat the valve, a spring actuated needle carried by the body and adapted to be moved in one direction on the seating of the valve by said valve, and manually actuated means for moving the needle in an opposite direction to unseat the valve for permitting draining of the hose and the returning of the valve to an open position.

2. A nozzle comprising a body connected to a fluid supplying hose, a discharge spout for said body, a valve seat in said body, a valve pivoted in said body and normally occupying a position below the path of flow of fluid through the body, means adapted to automatically move the valve into the path of the fluid so as to permit the fluid to force the valve against the seat, a casing carried by said body, a needle slidable in said casing, counteracting springs in the casing and connected to the needle for normally holding the needle in a position beyond the seat and in the path of the valve so as to permit the valve to move the needle in one direction moving into engagement with the seat, and manually controlled means adapted to force the needle in the opposite direction to unseat the valve and permit draining of the hose.

3. A nozzle comprising a sectional body, means detachably connecting the sections of the body together, means connecting one of the sections of the body to a fluid supplying hose, a valve seat located in one of the sections, a pivoted valve in the last named section and normally occupying a position below the flow of fluid through the body, means for automatically moving the valve into the path of the fluid to permit said fluid to move the valve into engagement with the seat, a slidably mounted needle in one of the sections of the body, counteracting springs for said needle and normally holding one end thereof in the path of the valve so as to permit the valve to move the needle in one direction when moving into engagement with the seat, and manually controlled means carried by the body and adapted to move the needle in an opposite direction to unseat the valve to permit draining of the hose and the return of the valve to an open position.

4. A nozzle comprising a body having a discharge end, a check valve in said body, a float for closing the valve, a slidably mounted needle in said body, means for positioning the needle in the path of the movement of the valve and adapted to be moved in one direction by the valve moving into a closed position, and means for moving the needle to force the valve into an open position.

In testimony whereof I affix my signature in presence of two witnesses.

WILLIAM B. LEE.

Witnesses:
F. H. HOLMES,
F. D. CLARK.